(No Model.)

W. SCOTT.
TRAP FOR BASINS, SINKS, &c.

No. 394,405. Patented Dec. 11, 1888.

Witnesses,
Norton Folsom.
Frances M. Brown.

Inventor.
William Scott.
by his Attorneys,
Brown Brothers

UNITED STATES PATENT OFFICE.

WILLIAM SCOTT, OF MALDEN, MASSACHUSETTS.

TRAP FOR BASINS, SINKS, &c.

SPECIFICATION forming part of Letters Patent No. 394,405, dated December 11, 1888.

Application filed November 25, 1887. Serial No. 256,156. (No model.)

*To all whom it may concern:*

Be it known that I, WILLIAM SCOTT, of the city of Malden, in the county of Middlesex and State of Massachusetts, have invented certain new and useful Improvements in Traps for Basins, Sinks, &c., of which the following is a full, clear, and exact description.

This invention relates to traps for basins, sinks, urinals, &c., having a pipe for the ventilating of the trap at its outlet side, and under this invention the discharge-pipe leading therefrom, and the ventilating and trap passages at the off side of the latter are arranged to meet and together to open to the discharge-passage in substantially one and the same direction, insuring a most perfect ventilation of said discharge-passage and of the trap, and preventing a siphoning of the latter. Again, the trap-passage at its outlet side and in relation to the communication of the ventilating-passage meeting thereat is provided with a fender or guard constructed and arranged to direct the liquid and matter passing through the trap directly into the discharge-passage with which it is in communication and to guard the ventilating-passage against their entrance therein, thus obviating all possibility of stopping up and fouling said ventilating-passage therewith. Further, the ventilating-passage is constructed with a trough or gutter about it to receive the drippings from its walls and to conduct them into the discharge-passage, preventing their dropping onto the standing water of the trap, and the discharge-passage is constructed with a guard about it to prevent the return to the trap of liquid or matter entered into therefrom, all substantially as hereinafter described.

Figure 1:
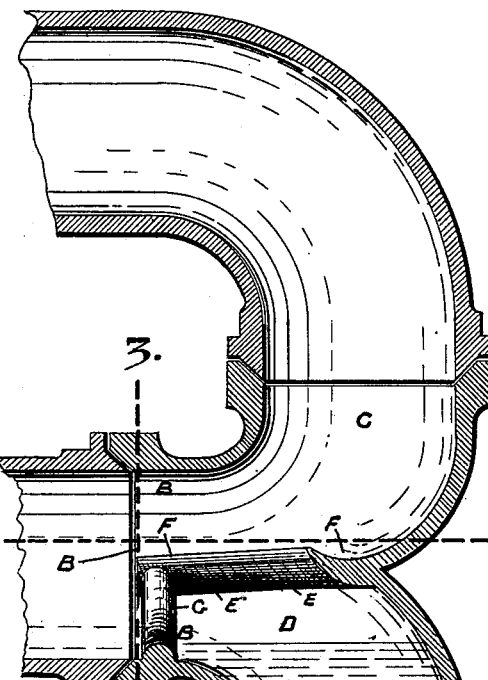
Figure 3:
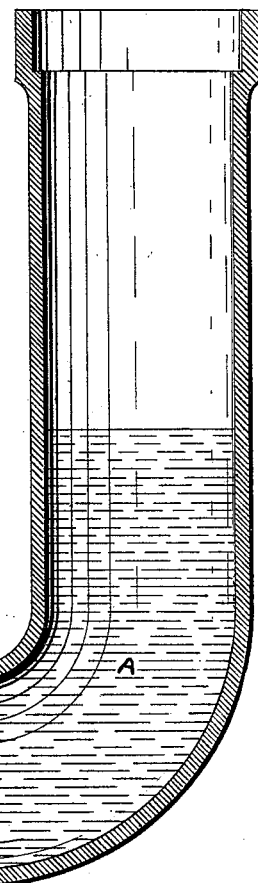
Figure 3:
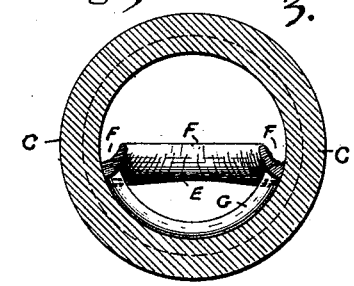
Figure 2:
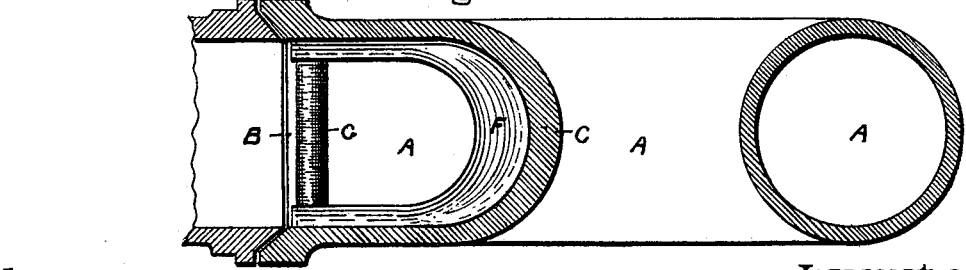

In the drawings forming part of this specification, Figure 1 is a central vertical section of the trap with ventilating and discharge passages severally constructed and arranged in accordance with this invention. Fig. 2 is a horizontal section, line 2 2, Fig. 1. Fig. 3 is a vertical section, line 3 3, Fig. 1.

In the drawings, A is the trap-passage, particularly shown of a U shape. B is the discharge-passage, and C is the ventilating-passage.

The discharge-passage B leads from the outlet side D of the trap A, and also the ventilating-passage C and the trap-passage A and the ventilating-passage C above it open to the discharge-passage B substantially in a common direction, and one substantially opposite to and in line with the receiving end of the discharge-passage.

E is a fender or guard which extends about and partially across the trap-passage at its outlet side above the plane of the level of its standing water and on its side opposite to the communication of the discharge-passage with the trap-passage. This fender E also projects about and partially across the ventilating-passage, and on its under side it is shaped to guide and direct the liquid and material passing through the trap-passage toward and into the discharge-passage away from the ventilating-passage. This guard or fender on its upper side has a trough or gutter, F, extending on its opposite sides to the discharge-passage, toward which at its opposite side it downwardly inclines, thereby to insure the flow of the matter and liquid deposited therein toward and into the discharge-passage and away from the standing water of the trap-passage at its outlet side.

G is a raised rounded rib or bead surrounding the lower side of the discharge-passage at its end communicating with the trap-passage.

A meeting of the trap and ventilating passages A C opposite to the communicating end of discharge-passage B with the trap-passage and their opening to the discharge-passage substantially in one and a common direction insure most perfect ventilation of the discharge-passage and of the trap-passage at its outlet side, at the same time preventing siphoning of the latter.

The guard or fender E at the outlet side of the trap-passage, and otherwise all as described, guards the ventilating-passage against the entrance of liquid and material from the trap-passage thereinto and guides and enters the same most directly to the discharge-passage, thus preventing the possibility of fouling and stopping up the ventilating-passage therewith. Again, the trough about the wall of the ventilating-passage at the communication thereof with the trap-passage and on its opposite sides leading to the discharge-passage operates to catch the drippings from the walls of the ventilating-passage and to conduct them into the discharge-passage, thus preventing their dropping onto the standing water of the trap at its outlet side to foul it. The raised bead G about the under side of the discharge-passage and at its communicating end with the trap-passage prevents dripping therefrom onto the standing water of the trap, and also the return of material and liquid entered into said passage, the advantage of which is manifest.

It is to be observed that suitable connections are to be made at the several passages A, B, and C, herein described, and that this invention is particularly applicable to basins, sinks, and urinals, but is not to be limited thereto.

Having thus described my invention, what I claim, and desire to secure by Letters Patent, is—

1. In a basin, sink, closet, and such like bowl the combination, with a trap, A, a discharge, B, leading horizontally from said trap, and a ventilating-passage, C, entering said discharge B, of a horizontal projection serving as a guard, E, at the opening of said ventilating-passage into said discharge-passage B and partially covering said opening to guard the ventilating-passage against the entrance of matter therein and to guide the same toward the discharge-passage, substantially as described.

2. In a basin, sink, closet, and such like bowl, the combination, with a trap, A, a discharge, B, leading from said trap, and a ventilating-passage, C, entering said discharge B, of a horizontal projection adapted on its upper surface to serve as a gutter or trough, F, and located at the communication of said ventilating-passage C with discharge B, to receive the drippings from said passage C and to conduct them into discharge B beyond the standing water of the trap, substantially as described.

3. In a basin, sink, closet, and such like bowl, the combination, with a trap, A, a discharge, B, leading from said trap, and a ventilating-passage, C, entering said discharge B, of a gutter or trough, F, at the communication of said ventilating-passage C with discharge B, and inclining along its length to receive the drippings from said passage C and to conduct them into discharge B beyond the standing water of the trap, substantially as described.

4. In a basin, sink, closet, and such like bowl, the combination, with a trap, A, a discharge, B, leading from said trap, and a ventilating-passage, C, entering said discharge B, of a gutter or trough, F, at the communication of said ventilating-passage C with discharge B to receive the drippings from said passage C and to conduct them into the discharge B beyond the standing water of the trap, and a raised bead, G, located beyond the standing water of the trap about the inner wall of the discharge B to prevent the return of liquid or matter from the discharge B to the trap A, substantially as described.

5. The combination, with a trap-passage, A, having at its outlet side a discharge-passage, B, and a ventilating-passage, C, and said ventilating-passage meeting said trap-passage opposite to said discharge-passage, and both opening thereto practically in a common direction, of a fender or guard, E, to the ventilating and trap passages, a gutter or trough, F, about the ventilating-passage and inclining and entering into the discharge-passage, and a raised bead, G, about the lower side of the discharge-passage, substantially as described, for the purposes specified.

In testimony whereof I have hereunto set my hand in the presence of two subscribing witnesses.

WILLIAM SCOTT.

Witnesses:
ALBERT W. BROWN,
FRANCES M. BROWN.